US011425356B2

(12) United States Patent
Taubin et al.

(10) Patent No.: US 11,425,356 B2
(45) Date of Patent: Aug. 23, 2022

(54) SYSTEM AND METHOD TO CALIBRATE AN UNCOLLIMATED LASER DIODE FOR 3D IMAGING APPLICATIONS

(71) Applicant: BROWN UNIVERSITY, Providence, RI (US)

(72) Inventors: Gabriel Taubin, Providence, RI (US); Wook Yeon Hwang, Providence, RI (US)

(73) Assignee: Brown University, Providence, RI (US)

(*) Notice: Subject to any disclaimer, the term of this patent is extended or adjusted under 35 U.S.C. 154(b) by 599 days.

(21) Appl. No.: 16/152,799

(22) Filed: Oct. 5, 2018

(65) Prior Publication Data

US 2019/0124320 A1    Apr. 25, 2019

Related U.S. Application Data

(60) Provisional application No. 62/568,668, filed on Oct. 5, 2017.

(51) Int. Cl.
| | |
|---|---|
| *H04N 13/254* | (2018.01) |
| *G01N 21/88* | (2006.01) |
| *H04N 13/246* | (2018.01) |
| *G06T 7/73* | (2017.01) |
| *G01B 11/25* | (2006.01) |

(Continued)

(52) U.S. Cl.
CPC ....... *H04N 13/254* (2018.05); *G01B 11/2433* (2013.01); *G01B 11/2504* (2013.01); *G01B 21/042* (2013.01); *G01N 21/8806* (2013.01); *G01N 21/8851* (2013.01); *G06T 7/73* (2017.01); *H04N 13/246* (2018.05); *G01N 2021/8829* (2013.01); *G01N 2021/8887* (2013.01);

(Continued)

(58) Field of Classification Search
None
See application file for complete search history.

(56) References Cited

U.S. PATENT DOCUMENTS

| | | | | |
|---|---|---|---|---|
| 6,111,601 A | * | 8/2000 | Adachi | G01B 11/2433 348/128 |
| 6,172,570 B1 | * | 1/2001 | Deng | G04F 5/14 331/3 |

(Continued)

OTHER PUBLICATIONS

"Diffractive Optical Elements", Holoeye, Retrieved from: http://holoeye.com/diffractive-optics on May 21, 2019, 4 pages.

(Continued)

*Primary Examiner* — David N Werner
*Assistant Examiner* — Mustafizur Rahman
(74) *Attorney, Agent, or Firm* — Adler Pollock & Sheehan P.C.

(57) ABSTRACT

A system and method to calibrate an uncollimated laser diode for three-dimensional imaging applications. A method includes providing an optical comparator having an uncollimated laser diode as a light source to generate a shadow with sharp boundaries when used to illuminate an opaque occluder, wherein a two lines source model of light propagation is used to describe a behavior of the uncollimated laser diode, the two lines source model defined by two three-dimensional (3D) lines as model parameters, the uncollimated laser diode calibrated by estimating the two lines as a function of a sample of a ray field emitted by the uncollimated laser diode.

10 Claims, 11 Drawing Sheets

(51) Int. Cl.
*G01B 21/04* (2006.01)
*G01B 11/24* (2006.01)
(52) U.S. Cl.
CPC .................. *G01N 2201/064* (2013.01); *G01N 2201/0612* (2013.01); *G01N 2201/12* (2013.01)

(56) References Cited

U.S. PATENT DOCUMENTS

| | | | |
|---|---|---|---|
| 8,400,633 B2 | 3/2013 | Polidor | |
| 9,086,273 B1* | 7/2015 | Gruver | G01S 17/42 |
| 9,503,708 B2* | 11/2016 | Hazeghi | G02B 27/425 |
| 2009/0129420 A1* | 5/2009 | Regaard | G02B 19/0028 372/50.12 |
| 2013/0128121 A1* | 5/2013 | Agarwala | H04N 13/221 348/607 |
| 2014/0192830 A1* | 7/2014 | Blauvelt | H01S 3/137 372/32 |
| 2017/0322048 A1* | 11/2017 | Yoshida | G01C 3/08 |

OTHER PUBLICATIONS

"Kinect", Microsoft, Kinect for Xbox 360, http://en.wikipedia.org/wiki/Kinect, Nov. 2010, 21 pages.
"Lasers and Laser-Related Equipment—Test Methods for Laser Beam Widths, Divergence Angles and Beam Propagation Ratios—Part 1: Stigmatic and Simple Astigmatic Beams. International Organization for Standardization", International Organization for Standardization, IS0-11146-1, Jan. 2005, 23 pages.
Ahuja et al., "Generating Octrees from Object Silhouettes in Orthographic Views", IEEE Transactions on Pattern Analysis and Machine Intelligence, vol. 11. No 2, Feb. 1989, pp. 137-149.
Baumgart, "Geometric Modeling for Computer Vision", PhD Thesis, Stanford University, Oct. 1974, 144 pages.
Kleiman et al., "Schubert Calculus", The American Mathematical Monthly, vol. 79, No. 10, Dec. 1972, pp. 1061-1082.
Koshel et al., "Data Format for Ray File Standard", In Proceedings of Renewable Energy and the Environment, Freeform Optics, Tucson, Arizona, United States, Nov. 2013, 1 page.
Lanman et al., "Reconstructing a 3D Line From a Single Catadioptric Image", Third International Symposium on 3D Data Processing, Visualization, and Transmission, IEEE, Jun. 2006, 9 pages.
Laurentini, "The Visual Hull Concept for Silhouette-Based Image Understanding", IEEE Transactions on Pattern Analysis and Machine Intelligence, vol. 16, No. 2, Feb. 1994, pp. 150-162.
Levoy et al., "Light Field Rendering", Proceedings of the 23rd Annual Conference on Computer Graphics and Interactive Techniques (Siggraph), Jul. 1996, 12 pages.
Salvi et al., "Pattern Codification Strategies in Structured Light Systems", Pattern Recognition, vol. 37. No. 4, Apr. 2004, pp. 827-849.
Smith, "Shedding Light on Optical Comparators", Quality Digest, May 2002, 6 pages.
Sun, "Measurement of Laser Diode Astigmatism", Optical Engineering, vol. 36, No. 4, Apr. 1997, pp. 1082-1087.
Szeliski, "Rapid Octree Construction from Image Sequences", CVGIP: Image Understanding, vol. 58, No. 1, Jul. 1993, pp. 23-32.
Li, et al., "Rotational Crossed-Slit Light Fields", In Proceedings of the IEEE Conference on Computer Vision and Pattern Recognition, vol. 1, 2016, pp. 4405-4413.(English Abstract Only).
Zomet, et al., "Mosaicing New Views: the Crossed-slits Projection", IEEE Transactions on Pattern Analysis and Machine Intelligence, vol. 25, Issue 6, Jun. 5, 2003, pp. 741-754.(English Abstract Only).
Hwang et al., "The Two Lines Light Source (TLLS)," 2017 International Conference on 3D Vision (3DV), 2017, pp. 254-262.

* cited by examiner

PRIOR ART

FIG. 1

PRIOR ART

SYSTEM AND METHOD TO CALIBRATE AN UNCOLLIMATED LASER DIODE FOR 3D IMAGING APPLICATIONS

CROSS REFERENCE TO RELATED APPLICATIONS

This application claims priority from earlier filed U.S. Provisional Patent Application Ser. No. 62/568,668, filed Oct. 5, 2017, which is incorporated by reference in its entirety.

BACKGROUND OF THE INVENTION

The invention generally relates to three-dimensional (3D) imaging, and more specifically to a system and method to calibrate an uncollimated laser diode for 3D imaging applications.

In general, an optical comparator is a device that applies the principles of optics to the inspection of manufactured parts. In an optical comparator, the magnified silhouette of a part is projected upon a screen, and the dimensions and geometry of the part are measured against prescribed limits. Smith-2002 (K. Smith. Shedding Light on Optical Comparators. Quality Digest, May 2002) teaches that the optical comparator was invented by James Hartness in 1922, in particular to address the problem of inspecting screw threads. Optical comparators have been used in machine shops since then, and have not changed very much in design over the years. To obtain accurate measurements with this instrument the object or feature being observed must be compared to a standard of known size. The first application of this principle was called a shadowgraph. This instrument used a lamp to project a two-dimensional (2D) image of the object being observed on a flat surface. The shadow could then be measured with a known standard, such as a ruler, to determine its size. This type of comparison allowed an inspector to determine if a part was in or out of tolerance. Modern optical comparators comprise imaging sensors so that the comparisons are made using image processing software. Accurate measurements require shadows with sharp boundaries, as well as mathematical models of light propagation and shadow formation to relate the shadow boundaries to the 3D dimensions of the inspected part. A typical optical comparator is described, for example, in U.S. Pat. No. 8,400,633B2 (E. Polidor. Method of Inspecting Test Parts with an Optical Comparator Having Digital Gage. U.S. Pat. No. 8,400,633 B2, March 2013).

The mathematical models underlying 3D imaging algorithms based on active illumination, such as shape-from-silhouette 3D reconstruction, and structured light 3D scanning using binary patterns, are also based on the assumption that the light sources are capable of generating shadows with sharp boundaries when they are used to illuminate opaque occluders. Many shape-from-silhouette 3D reconstruction methods and systems have been disclosed in the prior-art, for example by Baumgart-1974 (B. Baumgart. Geometric Modeling for Computer Vision. PhD thesis, Stanford University, 1974), Ahuja-etal-1989 (N. Ahuj a and J. Veenstra. Generating Octrees from Object Silhouettes in Orthographic Views. IEEE Transactions on Pattern Analysis and Machine Intelligence, 11(2):137-149, February 1989), Laurentini-1991 (A. Laurentini. The Visual Hull: A New Tool for Contour-Based Image Understanding. In Proceedings of the 7th Scandinavian Conference on Image Analysis. Pattern Recognition Society of Denmark, 1991), Szeliski-1993 (R. Szeliski. Rapid Octree Construction from Image Se-quences. CVGIP: Image Understanding, 58(1):23-32, July 1993), and Laurentini-1994 (A. Laurentini. The Visual Hull Concept for Silhouette-Based Image Understanding. IEEE Transactions on Pattern Analysis and Machine Intelligence, 16(2):150-162, February 1994). The prior-art on structured light 3D scanning with binary patterns is reviewed by Salvi-etal-2004 (J. Salvi, J. Pags, and J. Batlle. Pattern Codification Strategies in Structured Light Systems. Pattern Recognition, 37(4):827-849, April 2004).

Light Sources

Figure 1:
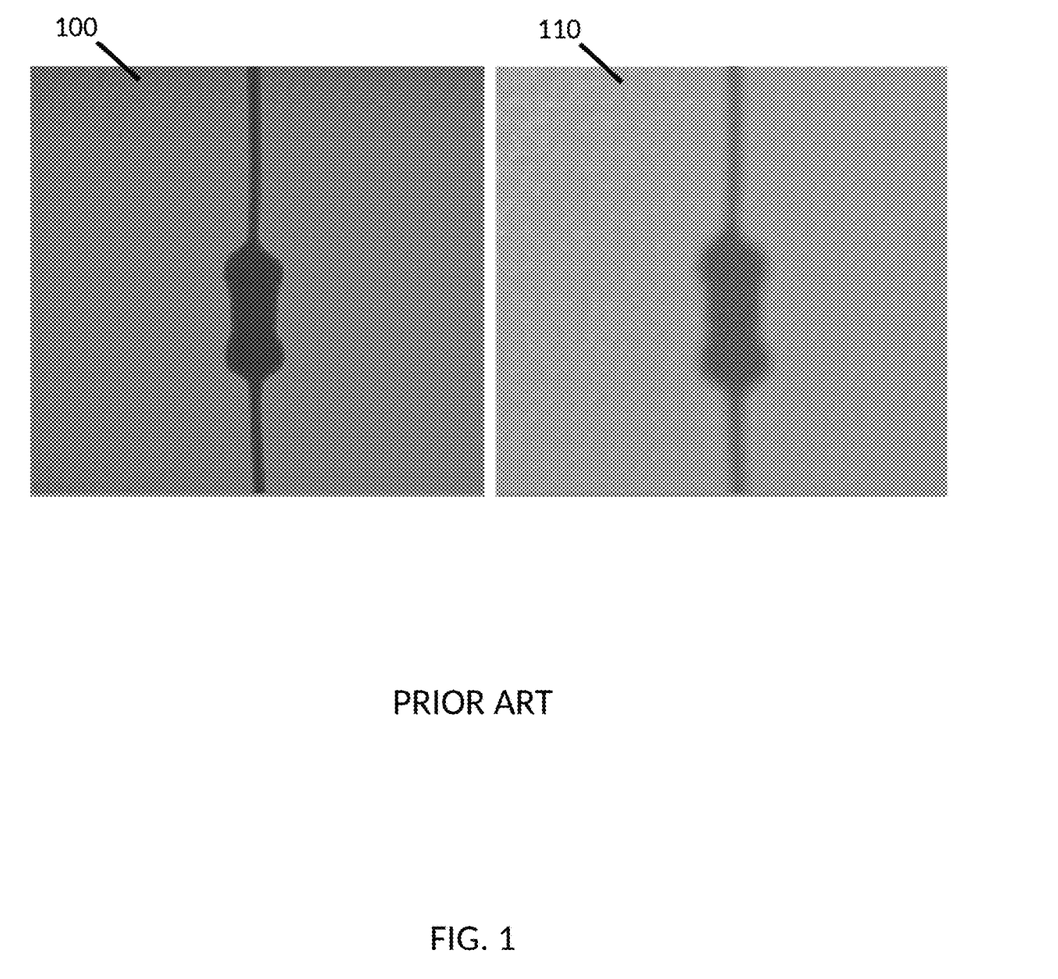
FIG. 1 is an illustration comparing the shadows produced using an uncollimated laser diode as a light source, and similar shadows produced using an LED as a light source.

In structure-from-silhouette 3D reconstruction, using a small extended light source such as a high intensity LED results in blurred shadow boundaries. FIG. 1 is an illustration which shows a first shadow 100 produced using an uncollimated laser diode as a light source, and a second shadow 110 produced using an LED as a light source. In both cases the same small object is illuminated by the two light sources under similar conditions, such as distance from light source to object, and from object to screen. In structured light 3D scanning, using a lens to focus a binary pattern on an object is intrinsically flawed due to depth of field constraints, because out of focus binary patterns look like shadow with blurred boundaries as well. Diffraction optical elements, such as those commercialized by Holoeye (Holoeye diffractive optical elements. http://holoeye.com/diffractive-optics), which do not require focusing with lenses, are used in certain single-shot 3D scanning devices, such as the Microsoft Kinect V1 (Microsoft. Kinect for Xbox 360. http://en.wikipedia.org/wiki/Kinect, November 2010). Unfortunately, the diffraction optical element technology is not appropriate to develop high resolution 3D scanners.

Figure 2:
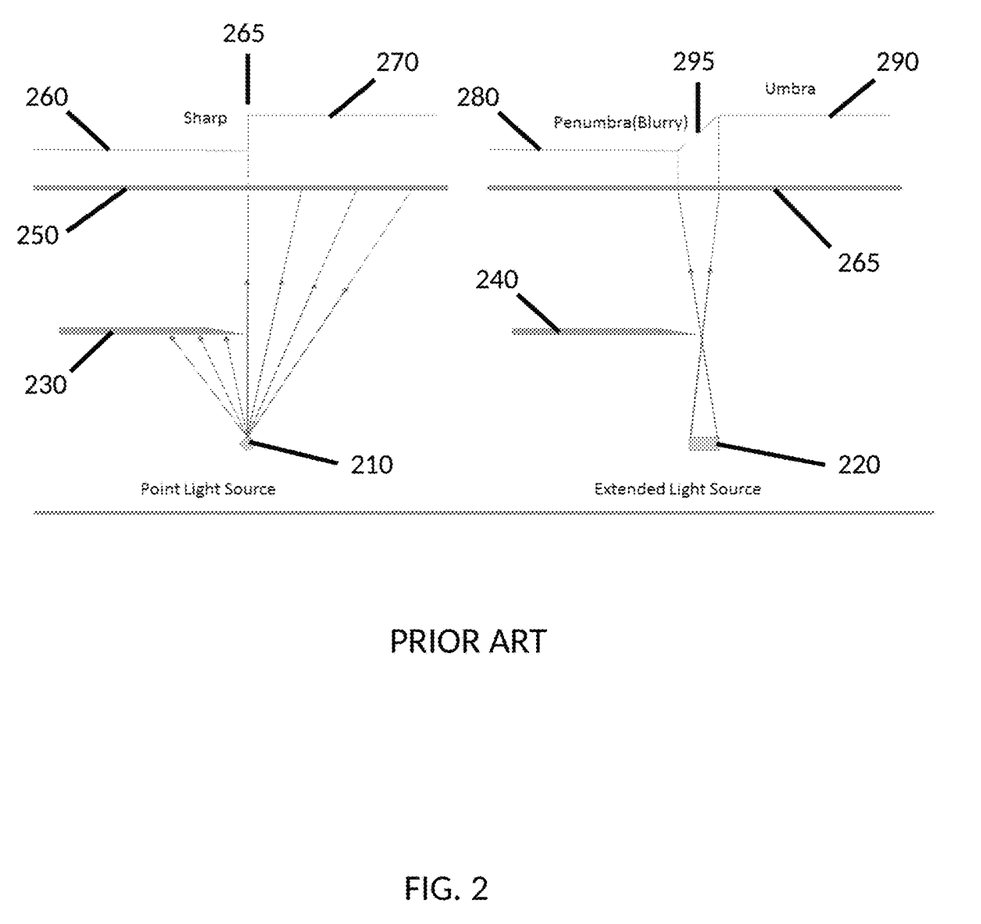
FIG. 2 is prior-art which illustrates the difference between a point light source, and an extended light source, when both illuminate similar occluders with sharp edges, and casting shadows on screens.

The point light source is a theoretical light source used to understand basic concepts in optics. FIG. 2 is prior-art which illustrates the difference between a point light source 210, and an extended light source 220, when both illuminate similar occluders 230,240 with sharp edges, and casting shadows on screens 250,265. For the point light source 210, every screen point is either fully illuminated 270 or totally in shadow 260 because the screen point is illuminated by at most one ray of light from the point light source. The silhouette 265 corresponding to the sharp boundary corresponds to a step discontinuity in illumination. For the extended light source 220, every screen point can be in complete shadow 280, totally illuminated 290, or partially illuminated by part of the extended light source. The illumination on the screen 265 varies continuously from the shadow region 280 to the fully illuminated region 290 defining a penumbra region 295, which appears to the eye as a blurry silhouette.

A point light source without focusing lenses illuminating the occluder would solve the problems in the two applications mentioned above, but unfortunately the point light source is a theoretical concept which does not exist in the physical world. In most real applications, the light sources are extended, and the dimensions of the light-emitting surface are not insignificant with respect to the dimensions of the overall imaging apparatus, and in particular with respect to the dimensions of the object being imaged, resulting in shadows with blurred boundaries. Furthermore, modeling the image formation process using extended light sources results in complex equations, which are usually impossible to solve in practice.

The Uncollimated Laser Diode

Figure 3:
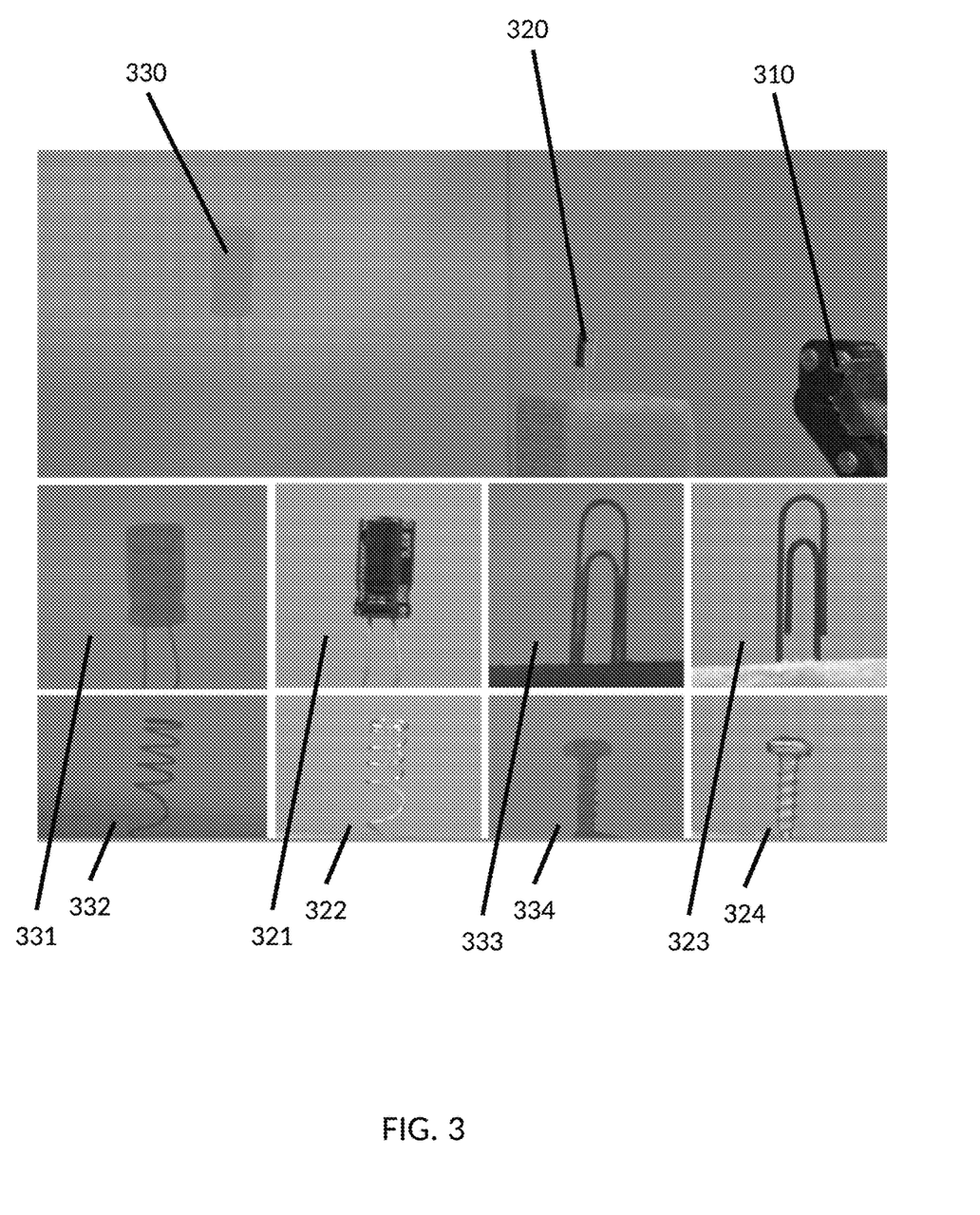
FIG. 3 is an illustration which shows that a low cost uncollimated laser diode produces shadow with sharp boundaries when it is used to illuminate an opaque occluder without any additional optical components, and the sharp boundaries in the shadows are maintained within a wide range of objects of various complexities, depth, and feature size.

FIG. 3 shows that a low cost uncollimated laser diode 310 produces shadow 330 with sharp boundaries when it is used to illuminate an opaque occluder 320 without any additional optical components, and the sharp boundaries in the shadows 331, 332, 333, 334 are maintained within a wide range of objects 321, 322, 323, 324 of various complexities, depth, and feature size.

Most light beams generated by semiconductor lasers are characterized by ellipticity, astigmatism, and large divergence. These properties are undesirable for light beam generation and are usually optically corrected. Due to diffraction, the beam diverges (expands) rapidly after leaving the chip, typically at 30 degrees vertically by 10 degrees laterally. Also, as a consequence of the rectangular shaped active layer and the non-uniform gain profile within the active layer, laser diode beams are astigmatic. Astigmatism is a well-known and documented property of laser diodes, as described by Sun-1997 (H. Sun. Measurement of Laser Diode Astigmatism. Optical Engineering, 36(4):1082-1087, April 1997), and even standards such as ISO-11146-1:2005 (ISO 11146-1:2005, lasers and laser-related equipment—test methods for laser beam widths, divergence angles and beam propagation ratios—part 1: Stigmatic and simple astigmatic beams. International Organization for Standardization, January 2005), exist to measure it. An astigmatic laser beam does not emerge from a single 3D point, but appears to be emerging from multiple locations. As a result of astigmatism the Partial Least Squares (PLS) model turns out not to be an accurate geometric model of light propagation for the Unit Load Device (ULD). Since astigmatism can vary from one laser diode to another even of the same type, calibration procedures are required to guarantee precise measurements.

The property illustrated in FIG. 3 has neither been documented in the optics literature nor in the computer vision literature. This discovery suggests that uncollimated laser diodes could be used as light sources in the target 3D imaging and metrology applications mentioned above, namely shape from silhouettes and structured light 3D scanning with binary patterns, potentially resulting in low cost precise industrial inspection, metrology, and 3D imaging systems.

However, since the point light source is not a good mathematical model to describe how light emitted by an uncollimated laser diode propagates, a new mathematical model of light propagation is needed to describe the behavior of the uncollimated laser diode, along with a method to estimate the parameters of such mathematical model from measurements.

Since an uncollimated laser diode produces shadows with sharp silhouettes and without penumbra, it is reasonable to require the new model of light propagation to have the following property: for each 3D point illuminated by the uncollimated laser diode, there should exist a unique ray emitted by the uncollimated laser diode which hits the 3D point. The point light source satisfies this property, because the direction of such unique ray is trivially defined by the vector going from the point light source to the 3D point. A new efficient method to analytically determine the mathematical description of the unique ray as a function of the model parameters is also needed to enable efficient implementations of the technology in the target 3D imaging applications.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an aspect, the invention features a method including providing an optical comparator having an uncollimated laser diode as a light source to generate a shadow with sharp boundaries when used to illuminate an opaque occluder, wherein a two lines source model of light propagation is used to describe a behavior of the uncollimated laser diode, the two lines source model defined by two three-dimensional (3D) lines as model parameters, the uncollimated laser diode calibrated by estimating the two lines as a function of a sample of a ray field emitted by the uncollimated laser diode.

In another aspect, the invention features a system including a uncollimated laser diode that emits a field of rays, a camera, a screen, and a mask, the mask configured as an occluder with a pattern of holes that enable light emitted by the uncollimated laser diode through, creating a pattern of bright spots on the screen.

Embodiments of the invention may have one or more of the following advantages.

The Two Lines Light Source model of light propagation is disclosed to accurately describe the behavior of uncollimated laser diodes. The two-lines light source model has a simple and elegant formulation defined by two 3D lines, rather than the single 3D point, which defines the point light source model, but it reduces to the point light source model when the two lines intersect. As a result, the two-lines light source model is a natural generalization of the point light source model.

As in the point light source model, for each illuminated 3D point there exists a unique ray emitted by the light source passing through the point, which can be described in closed form, and can be estimated in constant time at low computational cost. A method to evaluate said unique ray is disclosed.

A calibration method is disclosed to estimate the two lines light source model parameters. The mapping from illuminated points to emitted rays is referred to as the ray field emitted by the light source. The calibration method requires a sample of the ray field emitted by the uncollimated laser diode.

A system to sample the ray field emitted by the light source is disclosed.

These and other features and advantages will be apparent from a reading of the following detailed description and a review of the associated drawings. It is to be understood that both the foregoing general description and the following detailed description are explanatory only and are not restrictive of aspects as claimed

BRIEF DESCRIPTION OF THE DRAWINGS

These and other features, aspects, and advantages of the present invention will become better understood with reference to the following description, appended claims, and accompanying drawings where:

DETAILED DESCRIPTION OF THE INVENTION

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Several 3D imaging methods based on active illumination, such as silhouette-based 3D reconstruction and structured light 3D scanning with binary patterns, require light sources capable of generating shadows with sharp boundaries when they are used to illuminate opaque occluders. The invention develops the technological foundations to use an Uncollimated Laser Diode as the light source in the target applications. Since due to astigmatism the Point Light Source is not an accurate mathematical model of light propagation for the uncollimated laser diode, the Two Lines Light Source model of light propagation is disclosed to accurately describe the behavior of the uncollimated laser diode. The disclosed model is defined by two 3D lines as model parameters, rather than the single 3D point which defines the point light source. A calibration method is disclosed which estimates said two lines as a function of a sample of the ray field emitted by the uncollimated laser diode. A system to sample the ray field emitted by a directional extended light source is disclosed. The two lines light source model guarantees that for each illuminated 3D point there exists a unique emitted ray, which simultaneously passes through the point and intersects the two lines. Furthermore, said emitted ray can be computed in closed form at very low computational cost. Finally, a method to efficiently estimate the equation of said ray is also disclosed.

Modeling Extended Light Sources

To simplify the analysis, we will model the light emitting surface of the laser diode as a small rectangle contained in the plane $\{z=0\}$ aligned with the x and y Cartesian axes, centered at the origin, and with the light emitted only in the direction of $z>0$. A function $I(x,y,v)$ which attains non-negative values measuring the directional light intensity emitted in the direction of the unit length vector v so that $v_z > 0$ from the point (x,y) within the light emitter rectangle can be used as a general mathematical model to describe the rectangle as an extended light source where each point on the light emitter surface has a different directional distribution. In fact this representation, described by Koshel-etal-2013 (J. Koshel, I. Ashdown, W. Brandenburg, D. Chabaud, O. Dross, S. Gangadhara, K. Garcia, M. Gauvin, G. Gregory, D. Hansen, K. Haraguchi, G. Hansa, J. Jiao, R. Kelley, and J. Muschaweck. Data Format for Ray File Standard. In Proceedings of Renewable Energy and the Environment, Freeform Optics, Tucson, Ariz., United States, November 2013), corresponds to a file format which has been standardized to contain the information represented by the function $I(x,y,v)$, as well as additional information. The so-called Ray Files are predefined ray tables consisting of xyz starting points and direction vectors, as well as polarization states, wavelength data, and the initial flux value or Stokes Vector for each ray. Ray files are typically created from measured results or theoretical calculation and are used in illumination design software.

Directional Extended Light Sources

The model $I(x,y,v)$ introduced in the previous section can be regarded as a Light Field with the light traversing the rays in the opposite direction, and it is too general to describe the behavior of the uncollimated laser diode. The Light Field was introduced by Levoy-Hanrahan-1996 (M. Levoy and P. Hanrahan. Light Field Rendering. In Proceedings of the 23rd Annual Conference on Computer Graphics and Interactive Techniques (Siggraph'96), pages 31-42, 1996) as an image-based rendering representation. To explain the sharp shadow boundaries, it is necessary that for each point (x,y) in the light emitting surface the function $I(x,y,v)$ be close to zero except for a small region concentrated around a particular unit length direction vector $u(x,y)$ which could change from point to point. In the limit case the function $I(x,y,v)$ would be a generalized function $$I(x, y, z) = \begin{cases} I(x, y) & \text{if } v = u(x, y) \\ 0 & \text{if } v \neq u(x, y) \end{cases} \quad (1)$$

where $I(x,y)$ is a non-negative scalar function of two variables. Note that the ideal point light source satisfies this model, where $u(x,y)$ is the vector going from the point (x, y, 0) to the point source, normalized to unit length. We will refer to this model as the Directional Extended Light Source model, to the function $I(x,y)$ as the Intensity Light Field, and to the vector function $u(x,y)$ as the Vector Light Field of the model.

The Two Lines Light Source

The Two Lines Light Source model is disclosed. It is a particular parameterized type of directional extended light source defined by two straight lines $L_1$ and $L_2$, which can be described in parametric form as $$L_1 = \{q = q_1 + t_1 w_1\} \text{ and } L_2 = \{a = q_2 + t_2 w_2\}$$

where $q_1$ and $q_2$ are 3D points, $w_1$ and $w_2$ are two linearly independent unit length vectors, and $t_1$ and $t_2$ are scalar parameters.

In the case of the uncollimated laser diode, the light-emitting surface can be regarded as a rectangular aperture so that only rays that cross the aperture are light carrying. If the axes of the rectangular aperture are parallel to the vectors $w_1$ and $w_2$, then the aperture determines natural bounds on $t_1$ and $t_2$, but we do not introduce those parameters in the model. Note that there is neither guarantee that the two lines are perpendicular to each other, nor that they are aligned with the Cartesian axes.

Figure 4:
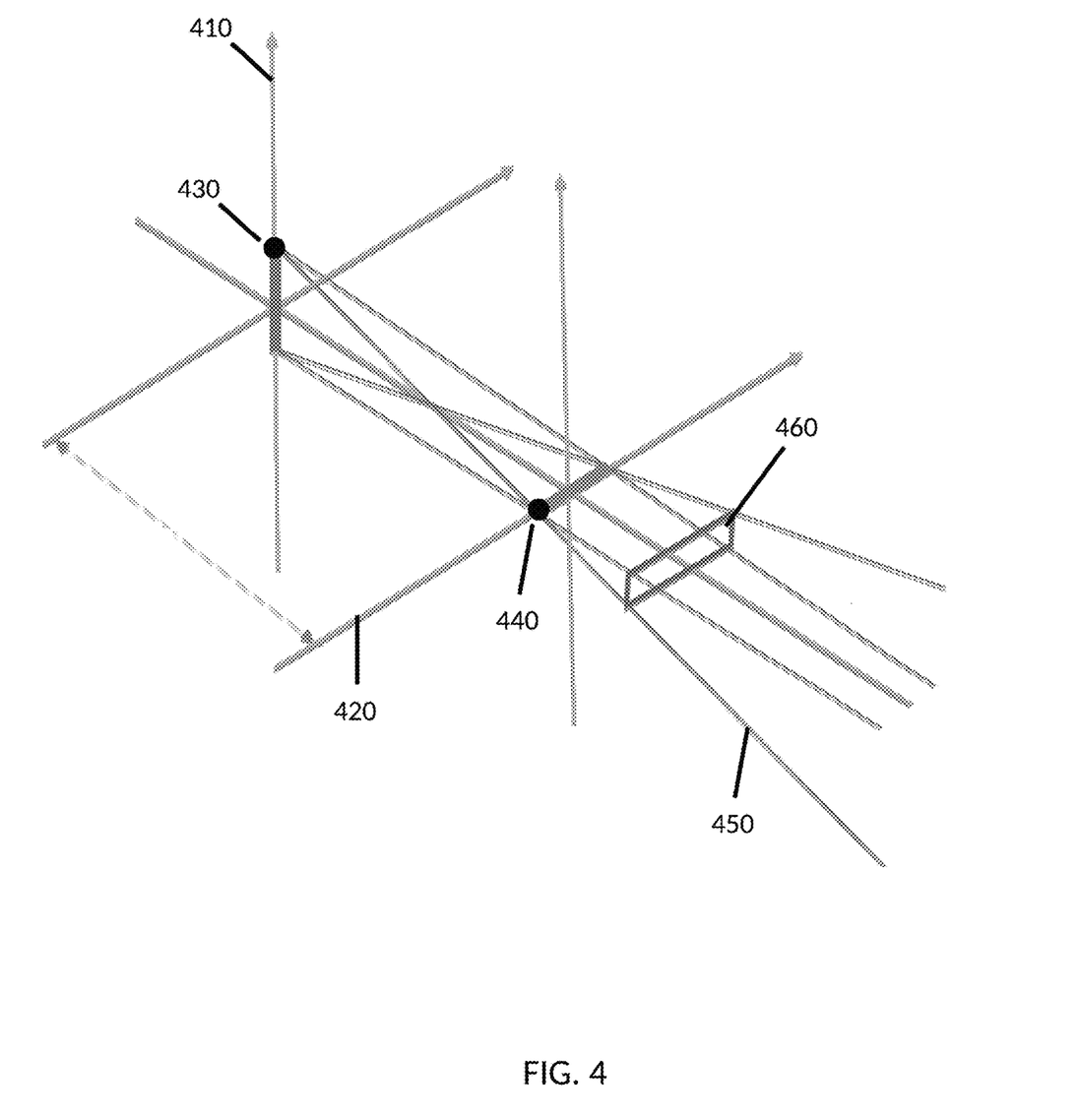
FIG. 4 is an illustration which describes the two lines point light source model.

FIG. 4 is an illustration, which describes the two lines light source model comprising a first straight line $L_1$ 410, and a second straight line $L_2$ 420. Each ray 450 emitted by the model is defined by one point $p_1$ 430 on line $L_1$ 410, and one point $p_2$ 440 on line $L_2$ 420. Every directed extended light source, and in particular those which can be modeled with the two lines light source, has an aperture 460, so that only rays which pass through the aperture are light emitting rays. However, the aperture is not included in the two lines light source model.

Unique Emitted Ray Through Each Illuminated 3D Point

Let us consider the two parallel planes spanned by the vectors $w_1$ and $w_2$; the first one containing the line $L_1$, and the second one containing the line $L_2$. The main property of the two lines light source model is that for each 3D point p which does not belong to either one of these two planes, there exist a unique line $L(p)$ which intersects both lines.

To determine the equation of the straight line $L(p)$, we observe that since the point p does not belong to the line $L_1$, there exists a unique plane $\pi_1 = \langle p, L_1 \rangle$ spanned by the line $L_1$ and the point p. Similarly, since the point p does not belong to the line $L_2$, there exists a unique plane $\pi_2 = \langle p, L_2 \rangle$ spanned by the line $L_2$ and the point p. These two planes $\pi_1$ and $\pi_2$ intersect, because both of them contain the point p, but are different from each other because the lines $L_1$ and $L_2$ are not parallel. It follows that the intersection of the two planes $\pi_1$ and $\pi_2$ is a straight line L. Since the line $L_1$ is neither contained nor parallel to the plane $\pi_2$, the intersection of the line $L_1$ with the plane $\pi_2$ is a single point $p_1$. By a similar reasoning, the intersection of the line $L_2$ with the plane $\pi_1$ is a single point $p_2$. The points $p_1$ and $p_2$ also belong to the line L because $$\{p_1\} = \pi_2 \cap L_1 \subseteq \pi_2 \cap \pi_1 = L \text{ and } \{p_2\} = \pi_1 \cap L_2 \subseteq \pi_1 \cap \pi_2 = L.$$

As a result, the straight line L determined by this geometric reasoning is the unique straight line $L(p)$ mentioned above.

Let us now consider the problem of determining the equation of the straight line $L(p)$, which is equivalent to determining the coordinates of the intersection points $p_1$ and $p_2$. The plane $\pi_1$ can be described in implicit form as $$\pi_1 = \{q : n_1^t(q-q_1) = 0\}$$

where $n_1 = w_1 \times (p-q_1)$ is a vector normal to the plane $\pi_1$. Similarly the plane $\pi_2$ can be described in implicit form as $$\pi_2 = \{q : n_2^t(q-q_2) = 0\}$$

where $n_2 = w_2 \times (p-q_2)$ is a vector normal to the plane $\pi_2$. Since the point $p_1$ belongs to the line $L_1$, there exists a unique value of the parameter $t_1$ so that $$p_1 = q_1 + t_1 w_1$$

Since the point $p_1$ also belongs to the plane $\pi_2$, the parameter $t_1$ must satisfy the following equation $$0 = n_2^t(p_1 - q_2) = n_2^t((q_1 - q_2) + t_1 w_1) \Rightarrow t_1 = \frac{n_2^t(q_2 - q_1)}{n_2^t w_1}.$$

Similarly, the point $p_2$ can be written as follows $$p_2 = q_2 + t_2 w_2$$

where the parameter $t_2$ has the value $$t_2 = \frac{n_1^t(q_1 - q_2)}{n_1^t w_2}.$$

Figure 5:
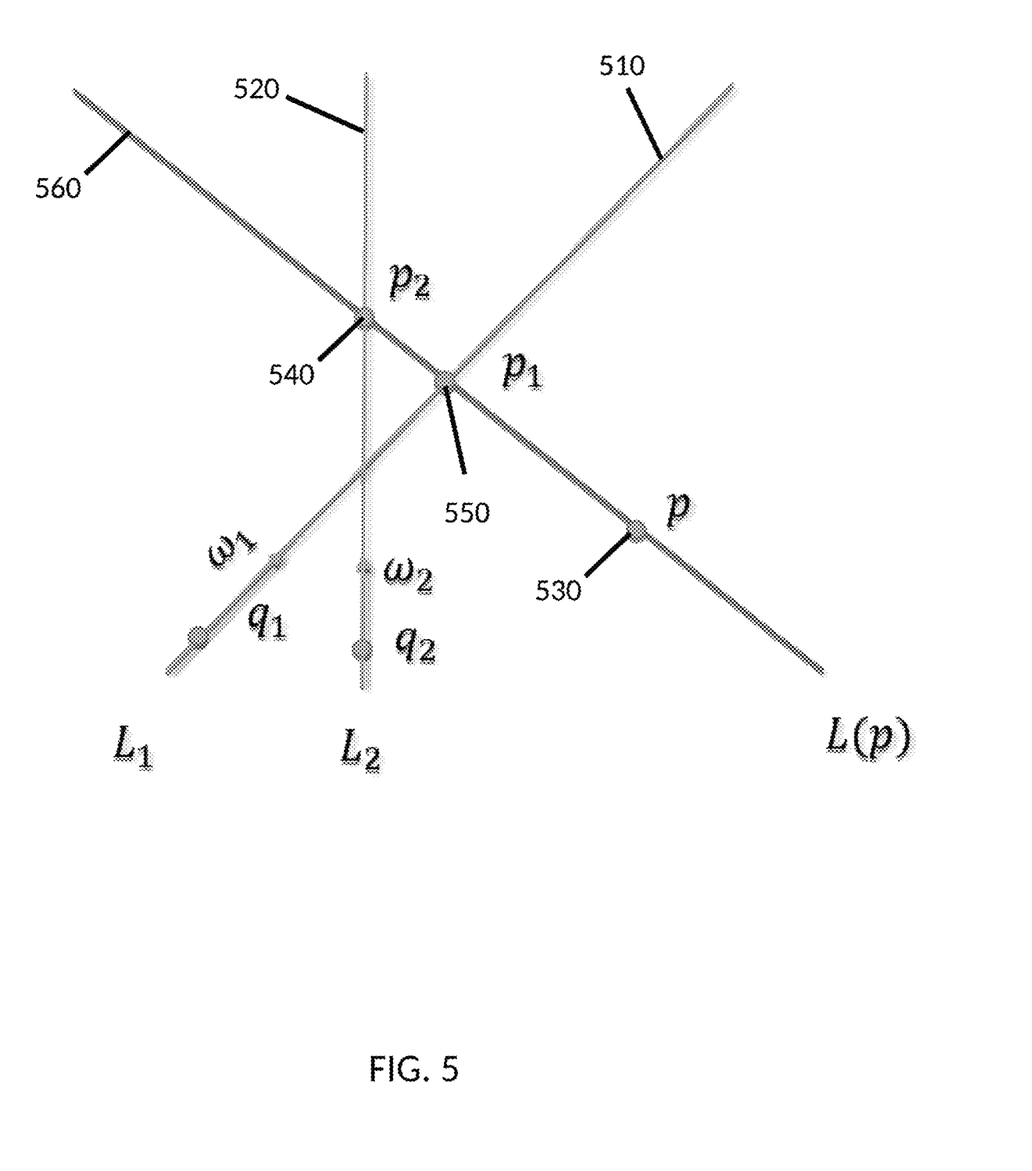
FIG. 5 is a line drawing which illustrates the geometric relationships existing between geometric elements in the two lines light source model.

FIG. 5 is a line drawing which illustrates the geometric relationships between the line $L_1$ 510, the line $L_2$ 520, the points p 530, $p_1$ 550, and $p_2$ 540, and the line $L(p)$ 560.

Figure 6:
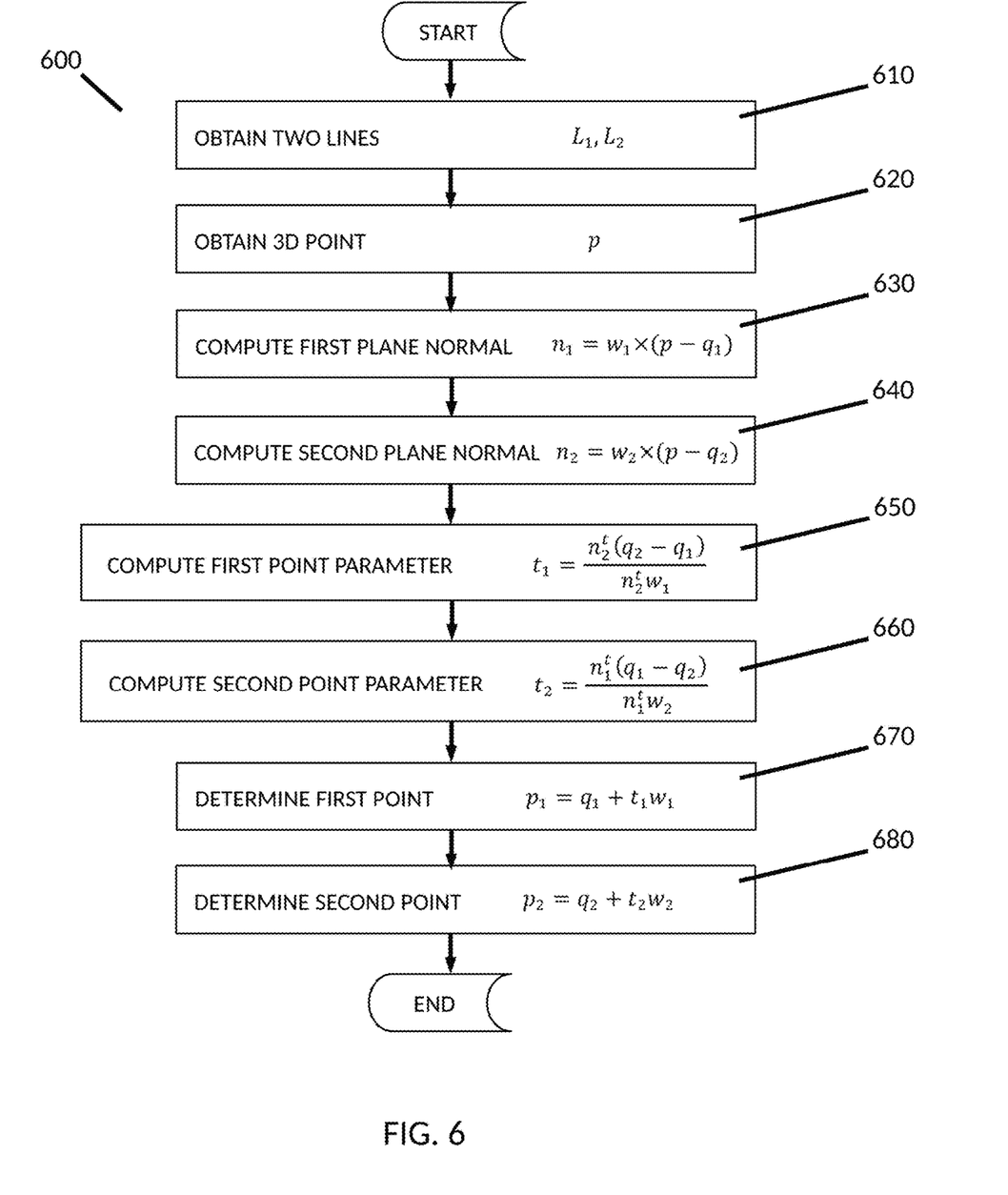
FIG. 6 is a flow chart describing a method to estimate the unique ray predicted by the two lines light source model passing through an illuminated point.

FIG. 6 is a flow chart describing a method 600 to estimate the unique ray $L(p)$ predicted by the two lines light source model passing through an illuminated point. In step 610 the two lines $L_1 = \{q = q_1 + t_1 w_1\}$ and $L_2 = \{q = q_2 + t_2 w_2\}$ are obtained. In step 620 the point p is obtained. In step 630 the first plane $\pi_1$ normal vector $n_1 = w_1 \times (p-q_1)$ is computed. In step 640 the second plane $\pi_2$ normal vector $n_2 = w_2 \times (p-q_2)$ is computed. In step 650 the parameter $t_1$ which determines the location of the point $p_1$ along line $L_1$ is computed. In step 660 the parameter $t_2$ which determines the location of the point $p_2$ along line $L_2$ is computed. In step 670 the coordinates of the point $p_1$ are determined. In step 680 the coordinates of the point $p_2$ are determined.

Calibration

A calibration method for the two lines light source model is disclosed, which takes as input a finite sample $\{R_1, \ldots, R_N\}$ of the light source ray field, and produces estimates of the two lines $L_1$ and $L_2$ which define the two lines light source model. Furthermore, each ray $R_k$ in the finite sample of the light source ray field is a straight line specified by a pair three-dimensional points $(p_k^M, p_k^S)$ and all the second points in these pairs $\{p_1^S, \ldots, p_N^S\}$ belong to a screen plane $\pi_S$. In a preferred embodiment all the first points of the pairs $\{p_1^M, \ldots, p_N^M\}$ belong to a mask plane $\pi_M$.

Given two arbitrary lines lines $L_1$ and $L_2$, the two lines light source model is used to determine the equation of the unique line $L(p_k^M)$ supporting the unique ray emitted by the light source which passes through the point $p_k^M$ as predicted by the model. The intersection of the line $L(p_k^M)$ and the plane $\pi_S$ is a point $q_k^S$, which in practice is likely to be different from the point $p_k^S$ due to measurement errors. The calibration process is formulated as the global minimization of the following bundle adjustment objective function, which measures the sum of the squares of the projection errors on the screen plane.

$$E(L_1, L_2) = \Sigma_{k=1}^N \|q_k^S - p_k^S\|^2 \qquad (2)$$

Since this is a non-linear multimodal objective function, an approximate solution is first determined by solving an initialization problem, for which an analytic solution exists, and then refine the approximate solution by locally minimizing the non-linear bundle adjustment objective function using prior-art numerical methods such as the Levenberg-Marquardt algorithm.

Figure 7:
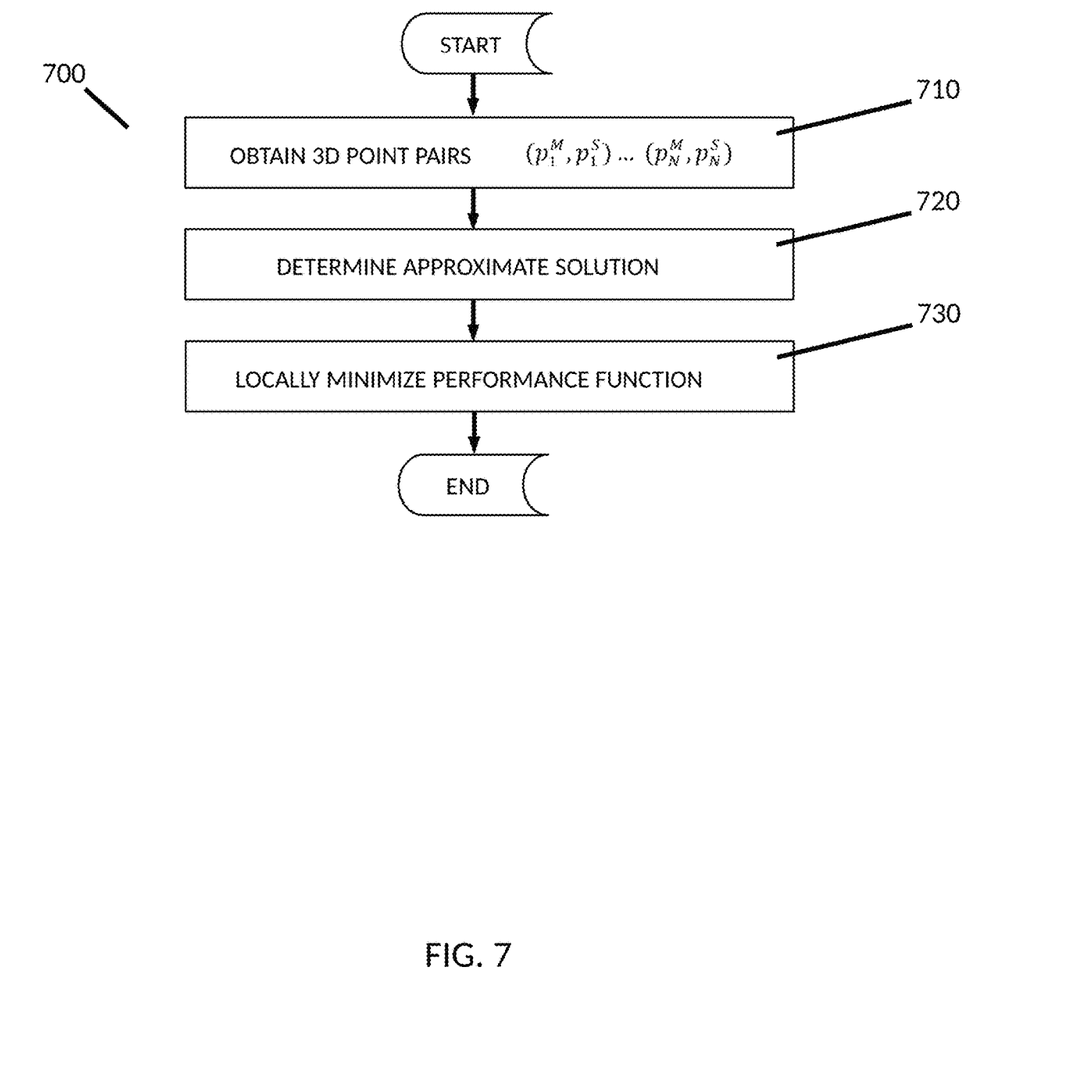
FIG. 7 is a flow chart describing a method to calibrate a light source using the two lines light source model.

FIG. 7 is a flow chart describing a method 700 to calibrate a light source using the two lines light source model. In step 710 the point pairs $(p_1^M, p_1^S), \ldots, (p_N^M, p_N^S)$ which define the rays $R_1, \ldots, R_N$ are obtained. In step 720 an approximate solution to the global optimization problem of minimizing the objective function of Equation 2 is determined. In step 730 the approximate solution is refined using a prior-art numerical descent method.

Initial Approximate Calibration Using Plucker Coordinates

A straight line in 3D can be represented by a 2×4 matrix defined by a pair of points (p,q) which belong to the line $$\begin{bmatrix} p_x & p_y & p_z & 1 \\ q_x & q_y & q_z & 1 \end{bmatrix} \quad (3)$$

This representation is, of course, not unique. The Plucker coordinates of this line can be defined as the 6-dimensional vector X whose coordinates are $$\begin{cases} X_{12} = p_x q_y - q_x p_y \\ X_{13} = p_x q_z - q_x p_z \\ X_{14} = p_x - q_x \\ X_{23} = p_y q_z - q_y p_z \\ X_{24} = p_z - q_z \\ X_{34} = q_y - p_y \end{cases} \quad (4)$$

It is known in the prior-art that given two 2×4 matrix representations of the same straight line, given by two different pairs of points, their corresponding Plucker coordinates are the same except for a multiplicative constant. Conversely, if two pairs of three-dimensional points have the same Plucker coordinates except for a multiplicative constant, then the two pairs of points belong to a common straight line. That is, the mapping which computes the Plucker coordinates as a function of the two points produces a point in the projective space $\mathbb{P}^5$ of dimension five. Not every point in $\mathbb{P}^5$ is the Plucker coordinate of a straight line in 3D though. Actually the image of the Plucker map forms a quadric Q in $\mathbb{P}^5$ defined by the zeros of the polynomial $$f(X) = X_{12}X_{34} - X_{13}X_{24} + X_{14}X_{23} \quad (5)$$

A classical mathematical result described by Kleiman-Laksov-1972 (S. L. Kleiman and D. Laksov. Schubert calculus. The American Mathematical Monthly, 79(10): 1061-1082, 1972), states that given four straight lines in general position in 3D there exist exactly two other straight lines that intersect the given four. A simple algorithm to determine these two lines, along with the mathematical foundations of the method, were proposed for example by Lanman-etal-2006 (D. Lanman, M. Wachs, G. Taubin, and F. Cukierman. Reconstructing a 3D line from a single catadioptric image. In Third International Symposium on 3D Data Processing, Visualization, and Transmission, pages 89-96, IEEE, 2006). It comprises the following steps: 1) constructing a 6×4 matrix by concatenating the Plucker coordinates vectors of the four given lines as columns; 2) determining a basis of the two dimensional subspace orthogonal to the four dimensional subspace spanned by the four vectors of Plucker coordinates (numerically, this can be achieved by computing the singular value decomposition of the 6×4 matrix, and determining the two singular vectors corresponding to the two zero singular values); 3) this two dimensional subspace is actually a straight line in $\mathbb{P}^5$ which intersects the quadric Q in two points; determine the two intersection points; 4) these two points in $\mathbb{P}^5$ are guaranteed to be the Plucker coordinates of two different straight lines in 3D; determine those two lines.

Given N>4 straight lines, such as the finite sample $\{R_1, \ldots, R_N\}$ of the light source ray field used as input to the calibration method, the previous SVD-based algorithm can be generalized, replacing the 6×4 matrix by the 6×N matrix resulting from concatenating the Plucker coordinates of the N straight lines, and determining the two dimensional subspace spanned by the two left singular vectors associated with the two smallest singular values. This process is used to compute an approximate initial solution in the calibration method.

Figure 8:
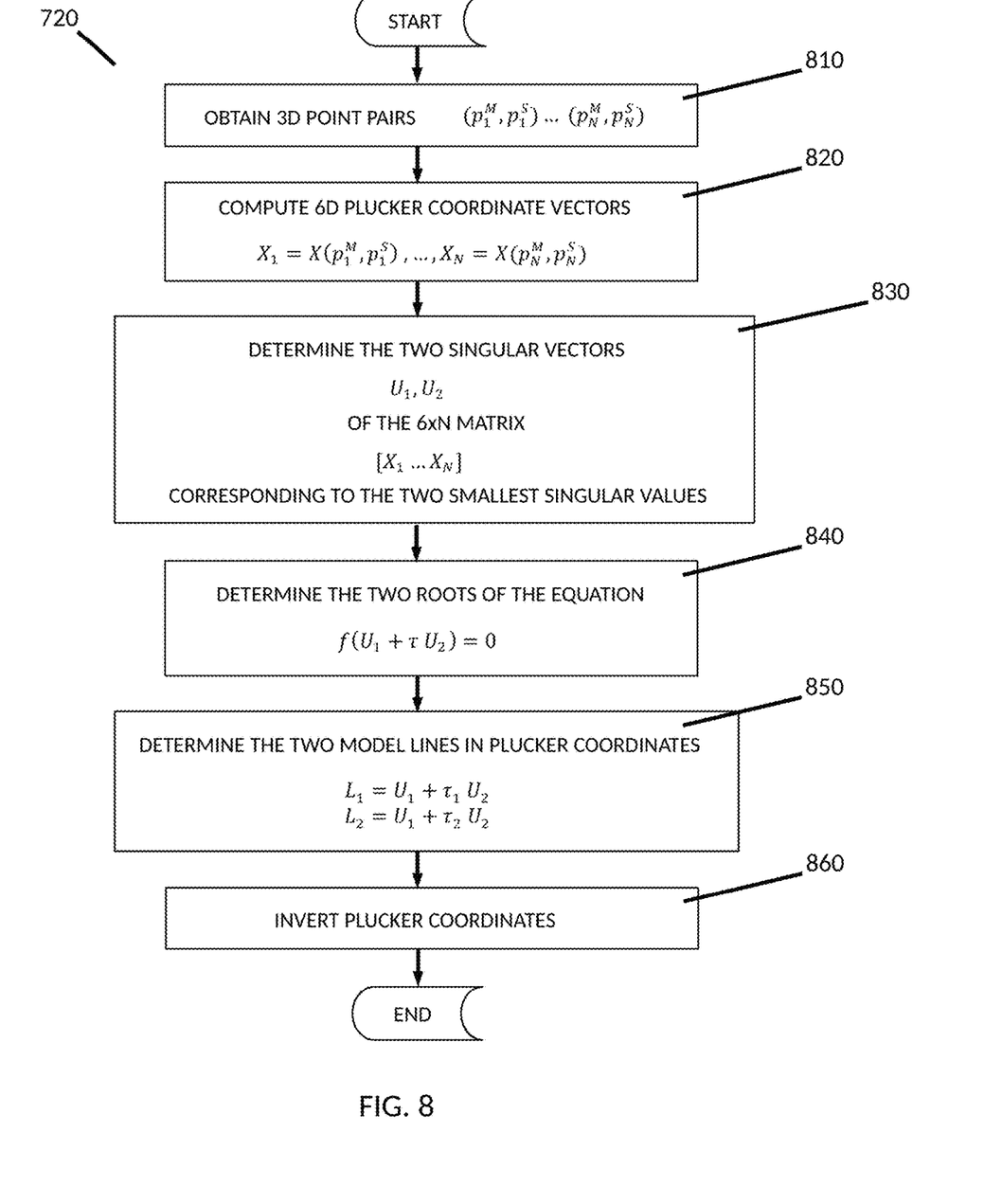
FIG. 8 is a flow chart describing the step of initializing in the method to calibrate a light source using the two lines light source model of FIG. 7.

FIG. 8 is a flow chart describing the step 720 of determining an approximate solution to the global optimization problem of minimizing the objective function of Equation 2. In step 810 the point pairs $(p_1^M, p_1^S), \ldots, (p_N^M, p_N^S)$ which define the rays $R_1, \ldots, R_N$ are obtained. In step 820 the 6D Plucker coordinate vectors $$X_1 = X(p_1^M, p_1^S), \ldots, X_N = X(p_N^M, p_N^S)$$

are computed for all the point pairs using Equation 4. In step 830 the two singular vectors of the 6×N matrix $[X_1 \ldots X_N]$, constructed by concatenating the Plucker vectors as columns, corresponding to the two smallest singular values, are determined. In step 840 the two roots $\tau_1$ and $\tau_2$ of the quadratic equation $$f(U_1 + \tau U_2) = 0$$

where f(X) is the polynomial of Equation 5. In step 850 the coordinates of the two model lines $L_1 = U_1 + \tau_1 U_2$ and $L_2 = U_1 + \tau_2 U_2$ are computed in Plucker coordinates. Finally in step 860 the Plucker coordinates are inverted to obtain the representation of the two lines in parametric form $L_1 = \{q = q_1 + t_1 w_1\}$ and $L_2 = \{q = q_2 + t_2 w_2\}$.

Alternative Refinement Scheme

In the previous section a method to determine initial estimates for the two lines minimizing the objective function of equation 2 was disclosed. It can be observed in practice that these initial estimates are often not sufficiently good, and a descent procedure is required to refine these estimates. In a preferred embodiment the calibration method refines the initial estimate using the following approach as an alternative to minimizing the objective function of Equation 2.

As a reminder, the input data to both the initialization procedure and the refinement procedure are the points $\{p_1^M, \ldots, p_1^M\}$, and the points $\{p_1^S, \ldots, p_1^S\}$. The pairs $(p_k^M, p_k^S)$ define the ray samples obtained from measurements. In this embodiment the points $\{p_1^S, \ldots, p_1^S\}$ are not required to be coplanar.

To simplify the notation in this section, let's replace $p_k^M$ by $p_k$, and let $v_k$ be the result of normalizing the vector $p_k^M - p_k^S$ to unit length. Each pair $(p_k, v_k)$ defines the parametric equation of a line supporting a measured ray. Since the two straight lines $L_1$ and $L_2$ that define the TLLS model should intersect the N measured lines, the approach in this embodiment is to look at the function which measures the sum of the square distances from an arbitrary line to the N measured lines, and search the domain of this function for the two different local minima predicted by Kleiman-Laksov-1972.

It is known in the prior-art that the following equation describes the square of the distance between an arbitrary straight line=$\{p + t v\}$ and the straight line $L_k = \{p = p_k + t_k v_k\}$ $$dist(L, L_k)^2 = \left( \frac{(v \times v_k)^t (p - p_k)}{\|v \times v_k\|} \right)^2 \quad (6)$$

It follows that the following expression describes the average square distance from the line L to the N given lines $$E(L) = \frac{1}{N}\sum_{k=1}^{N}\left(\frac{(v\times v_k)^t(p-p_k)}{\|v\times v_k\|}\right)^2 \quad (7)$$

This new objective function can also be written as follows $$E(L) = \frac{1}{N}\sum_{k=1}^{N}(w_k^t(p-p_k))^2 \quad (8)$$

where $w_k=(v\times v_k)/\|v\times v_k\|$. Note that for fixed values of $v, v_1, \ldots, v_N, p_1, \ldots, p_N$ the objective function E(L) is a quadratic non-negative function of p. As a result the optimal value of p can be computed in closed form as $$p = \left(\frac{1}{N}\sum_{k=1}^{N}(w_k w_k^t)\right)^{-1}\left(\frac{1}{N}\sum_{k=1}^{N}(w_k^t p_k)\right) \quad (9)$$

As a result, the objective function of Equation 8 can be regarded as function of only the vector v, which is a unit length vector. One of many prior-art methods to parameterize the unit sphere can be used to convert the resulting constrained non-linear least squares optimization problem into an unconstrained non-linear least squares problem defined on a two dimensional domain. One of many prior-art numerical methods exist to locally minimize unconstrained non-linear least squares problems.

Sampling the Ray Field Emitted by a Directional Extended Light Source

Figure 9:
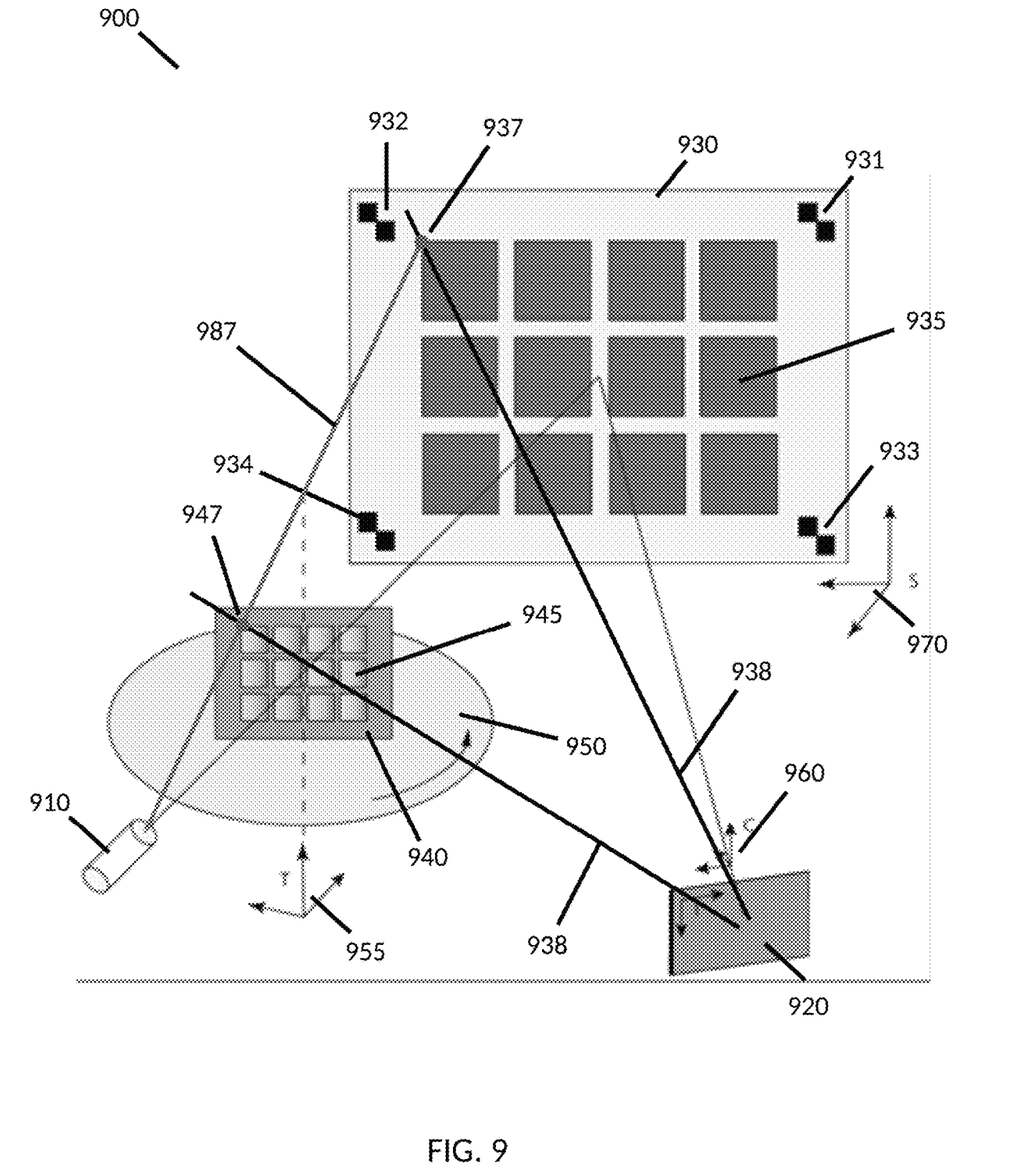
FIG. 9 shows a system designed to sample the field of rays emitted by a directional extended light source.

FIG. 9 shows a system 900 to sample the field of rays emitted by a directional extended light source 910. In addition to the directional extended light source 910, the system comprises a camera 920, a screen 930, and a mask 940. In a preferred embodiment, the system also comprises a turntable 950 used to rotate the mask 940 with respect to the other system elements, which remain static with respect to each other. The mask 940 is an occlude with a pattern of holes 945 which let the light emitted by the light source 910 through creating a pattern of bright spots 935 on the screen 930. In a preferred embodiment the holes 945 are rectangles with identifiable hole corners 947, and the corresponding bright spots 935 are quadrilaterals with identifiable bright spot corners 937, which can be put in correspondence. In a preferred embodiment the mask 940 is a thin chemically etched metal mask comprising an array of 3×4 square holes 945, resulting in 48-hole corners 947 corresponding to 48 bright spot corners 937.

The intrinsic parameters of the camera 920 are calibrated using prior-art camera calibration method. The camera coordinate system 960 is used as the global coordinate system to describe the coordinates of all the straight lines and points. The camera 920 is positioned so that both the mask 940 and the screen 930 are contained in the camera field of view. The hole corners 947 of the mask are detected in the image captured by the camera 920 using a modified checkerboard detection algorithm. The boundary edges of the holes 945 are detected and segmented into collinear groups. A straight line is fit to each collinear group. The pixel locations corresponding to the hole corners 947 are estimated as the intersections of vertical and horizontal lines. Since the dimensions of the mask 940 are known, the pose of the mask 940 in the global coordinate system 960 is determined as a function of the pixel coordinates of the labeled square corners using a prior-art checkerboard pose estimation algorithm.

The screen 930 is fabricated with a few fiducials 931, 932, 933, 934, which are used to determine the pose of the screen plane and its implicit equation using a prior-art pose estimation algorithm. With minimal modifications, the same algorithm used to detect the hole corners 947 of the mask in the image is used to detect the bright spot corners 937 of the screen also in the image. The pixel coordinates of each of these corresponding pairs of corners (947,937) define a ray, which passes through the corresponding screen point and the center of projection of the camera. The intersection if this ray, represented in parametric form, with the screen plane, represented in implicit form, yields the 3D coordinates of the corresponding bright spot corner 937 in the screen. For each of the 48 square corners of the mask we now have its 3D coordinates, as well as the 3D coordinates of a corresponding screen point. These two points belong to the same ray emitted by the laser, and are used to determine the equation of the straight line supporting the ray.

Because of the different distances from the mask 940 and screen 930 to the camera 920 and the different sizes, in practice it is difficult to focus the camera so that the mask 940 and the screen 930 are both in focus simultaneously. Since refocusing the camera requires geometric recalibration of the camera, in this case the system would not be able to perform its function with accuracy.

Figure 10:
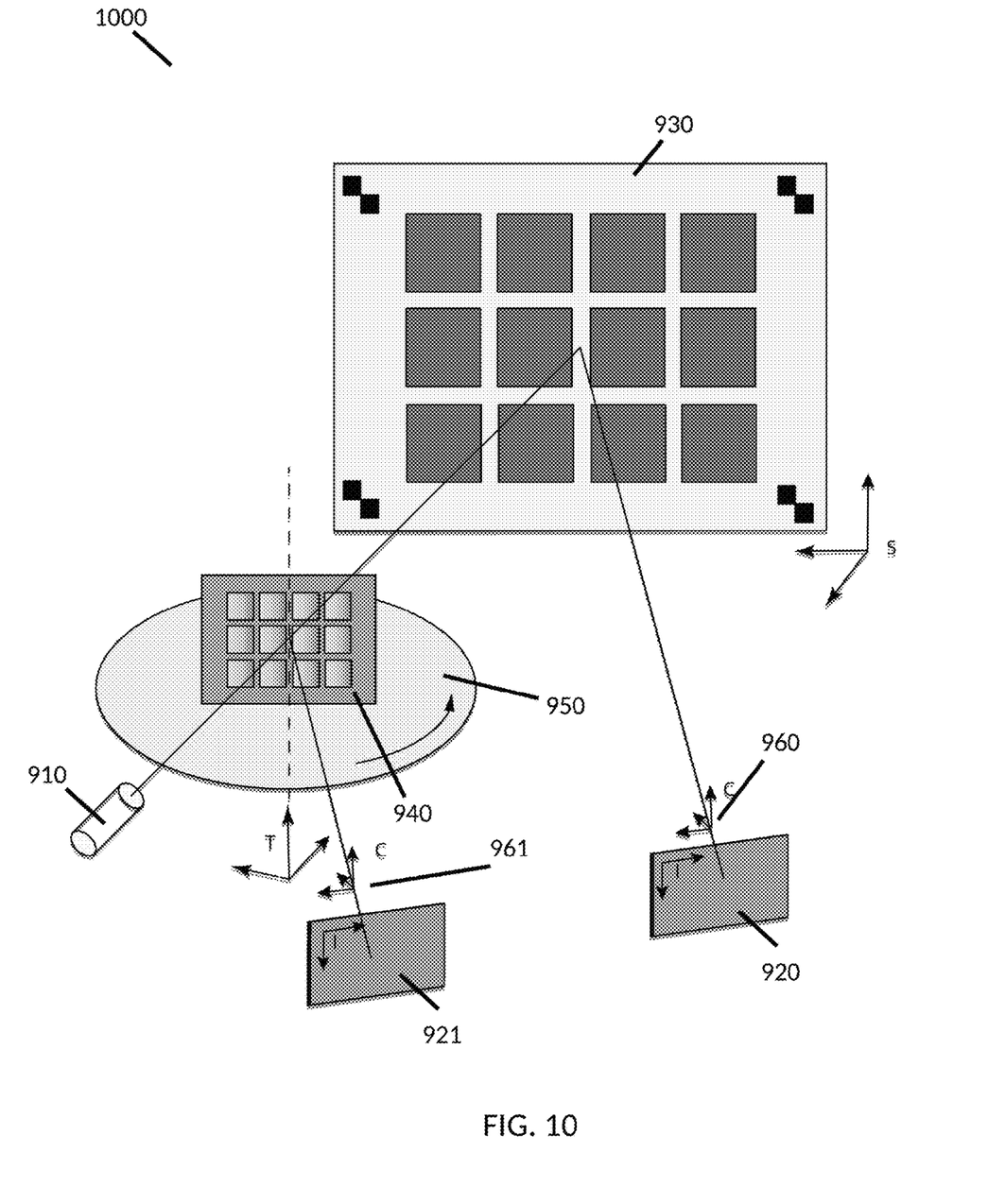
FIG. 10 shows a preferred embodiment of the system designed to sample the field of rays emitted by a directional extended light source using two cameras.

FIG. 10 shows a preferred embodiment 1000 of the system 900 designed to sample the field of rays emitted by a directional extended light source using two cameras. The system 1000 comprises all the elements of the system 900, plus a second camera 921. In this embodiment the field of view of camera 920 contains only the image of the screen 930, and the field of view of the second camera 921 contains the image of the mask 940. Camera 920 is focused on the screen 930, and camera 921 is focused on the mask 940. The two cameras are calibrated using a prior-art stereo calibration algorithm, which is used to transform coordinates from the second camera coordinate system 961 to the global coordinate system 960.

Figure 11:
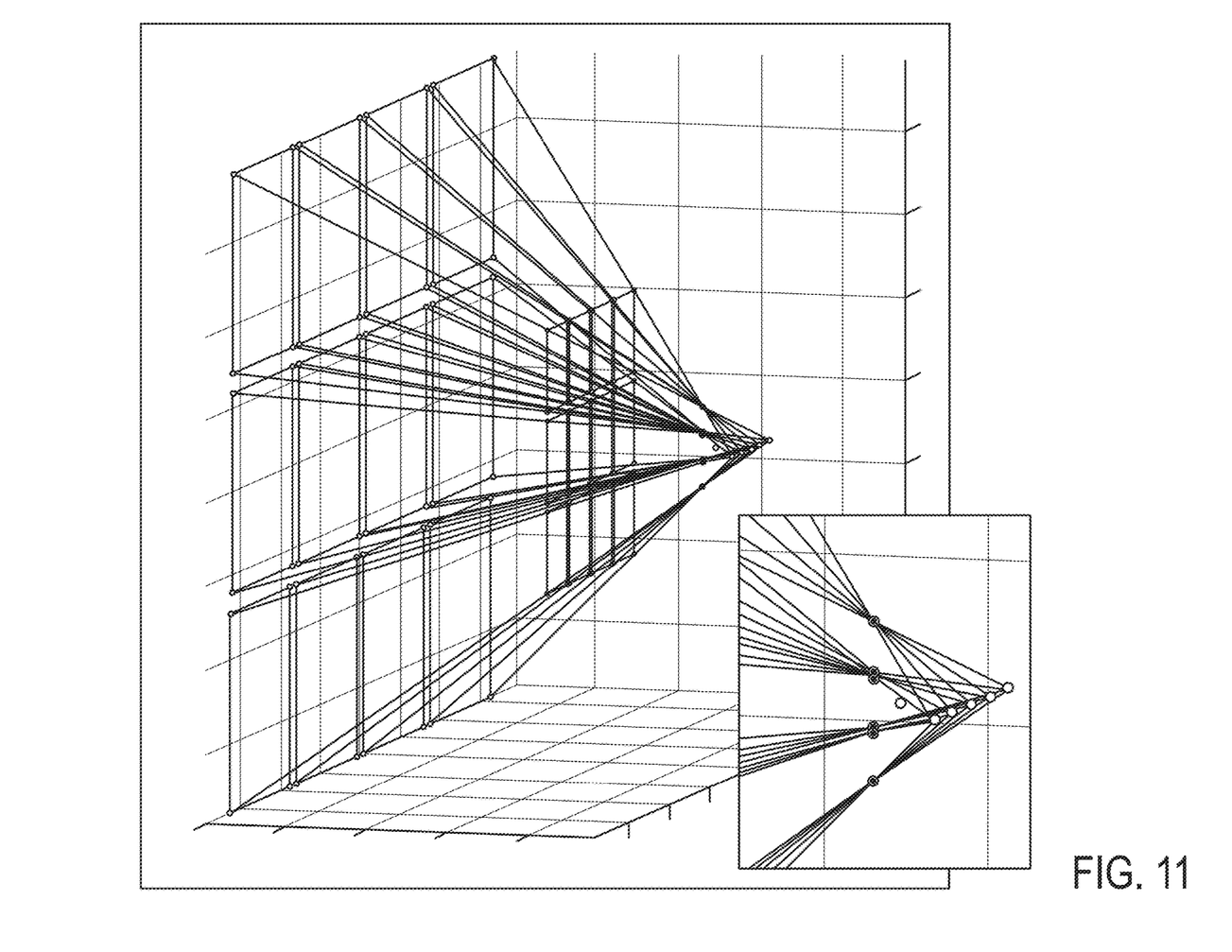
FIG. 11 is a line drawing which shows a visualization of the rays sampled by the systems described in FIGS. 9 and 10.

FIG. 11 is a line drawing which shows a visualization of the rays sampled by the systems described in FIGS. 9 and 10. It is quite clear that these rays do not converge on a single 3D point. As a result, although the uncollimated laser diode emits rays which diverge and do not seem to intersect within the working volume, it is clear that it does not behave like a point light source. However, the two straight lines predicted by the two lines light source model are clearly visible.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method comprising:

providing an optical comparator having an uncollimated laser diode as a light source to generate a shadow with sharp boundaries when used to illuminate an opaque occluder, wherein a two lines source model of light propagation is used to describe a behavior of the uncollimated laser diode, the two lines source model defined by two three-dimensional (3D) lines as model parameters, the two lines source model comprising a first straight line; and a second straight line, wherein each ray emitted by the model is defined by one point on the first straight line and one point on the second straight line, the uncollimated laser diode calibrated by estimating the two lines as a function of a sample of a ray field emitted by the uncollimated laser diode.

2. The method of claim 1 wherein for each 3D point that does not belong to either one of two planes that include the first straight line and the second straight line, there exists a unique line which intersects both lines.

3. The method of claim 2 wherein calibrating comprises:

using the two lines light source model to determine an equation of the unique line $L(p_k^M)$ supporting a unique ray emitted by the light source which passes through a point $p_k^M$ as predicted by the model, the intersection of the line $L(p_k^M)$ and the plane $\pi_S$ being a point $q_k^S$ and formulating as a global minimization of a bundle adjustment objective function, $$E(L_1, L_2) = \Sigma_{k=1}^{N} \|q_k^S - p_k^S\|^2$$

which measures a sum of the squares of projection errors on a screen plane, where $p_k^M$ is a corner of a hole in the mask, $p_k^S$ is the projection of the $p_k^M$ corner detected on the screen, and $k=1, \ldots N$, N is the number of corners in the mask.

4. A system comprising:

an uncollimated laser diode that emits a field of rays;

a camera;

a screen; and a mask, the mas configured as an occluder with a pattern of holes that enable light emitted by the uncollimated laser diode through, creating a pattern of bright spots on the screen, wherein each of the holes are rectangles with identifiable hole corners and the corresponding bright spots are quadrilaterals with identifiable bright spot corners, which can be put in correspondence.

5. The system of claim 4 wherein the mask is a thin chemically etched metal mask comprising an array of 3×4 square holes, resulting in 48-hole corners corresponding to 48 bright spot corners.

6. The system of claim 4 wherein the camera includes a camera coordinate system to describe the coordinates of all the straight lines and points.

7. The system of claim 6 wherein the camera is positioned so that both the mask and the screen are contained in a camera field of view.

8. The system of claim 4 wherein the identifiable hole corners are detected in an image captured by the camera using a modified checkerboard detection algorithm, wherein boundary edges of the holes are detected and segmented into collinear groups, a straight fitted to each collinear group, pixel locations corresponding to the hole corners estimated as intersections of vertical and horizontal lines.

9. The system of claim 4 wherein the screen is fabricated with fiducials used to determine a pose of a screen plane and its implicit equation using a pose estimation algorithm, the pose estimation algorithm used to detect the hole corners of the mask in the image and the bright spot corners of the screen also in the image, pixel coordinates of each of these corresponding pairs of corners defining a ray, which passes through a corresponding screen point and a center of projection of the camera.

10. The system of claim 9 wherein an intersection of the ray with the screen plane yields the 3D coordinates of the corresponding bright spot corner in the screen.

* * * * *